United States Patent
Gustin et al.

(10) Patent No.: US 9,562,626 B2
(45) Date of Patent: Feb. 7, 2017

(54) BRACKET FOR TUBULAR ELEMENT, IN PARTICULAR FOR AIRCRAFT

(71) Applicant: Airbus Operations (SAS), Toulouse (FR)

(72) Inventors: Etienne Gustin, Besancon (FR); Adrien Pique, Idron (FR); Tyron Billington, Toulouse (FR); Luc Michelet, Cornebarrieu (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 15/043,875

(22) Filed: Feb. 15, 2016

(65) Prior Publication Data

US 2016/0245428 A1 Aug. 25, 2016

(30) Foreign Application Priority Data

Feb. 24, 2015 (FR) ..................................... 15 51578

(51) Int. Cl.
*F16L 3/08* (2006.01)
*F16L 3/02* (2006.01)
(Continued)

(52) U.S. Cl.
CPC .................. *F16L 3/02* (2013.01); *B64C 1/406* (2013.01); *B64D 47/00* (2013.01); *F16B 21/02* (2013.01);
(Continued)

(58) Field of Classification Search
CPC ................ F16L 3/02; F16L 3/127; F16L 3/13; F16L 3/24; B64D 47/00; F16M 13/022; B64C 1/406; F16B 2/22; F16B 21/02; F16B 21/04; F16B 21/065; F16B 21/086; H02G 3/263; H02G 3/32
(Continued)

(56) References Cited

U.S. PATENT DOCUMENTS 3,135,488 A * 6/1964 Leonard .................. G09F 13/26
248/50
3,154,281 A * 10/1964 Charles ................... F16B 21/06
174/138 G
(Continued)

FOREIGN PATENT DOCUMENTS

DE 4032865 A1 * 4/1992 ............. F16B 21/02
DE 202005015875 2/2007
(Continued)

OTHER PUBLICATIONS

French Search Report, Dec. 16, 2015, priority document.

*Primary Examiner* — Gwendolyn Baxter
(74) *Attorney, Agent, or Firm* — Greer, Burns & Crain Ltd.

(57) ABSTRACT

A tubular element bracket comprises at least one central body elongate along a longitudinal axis, comprising a central portion elongate along the longitudinal axis and a support element configured to receive at least one tubular element, the support element being arranged at one end of the central body, referred to as the upper end, and a fixing plate configured to be fixed to a support, notably of an aircraft. The central portion and the support element are formed in one piece. The support element is in the form of an open fixing collar. The bracket comprises a fixing arrangement configured to make it possible to fix the central body manually and autonomously to the fixing plate by its other end, referred to as the lower end.

10 Claims, 8 Drawing Sheets

(51) Int. Cl.

| | |
|---|---|
| *B64D 47/00* | (2006.01) |
| *F16M 13/02* | (2006.01) |
| *B64C 1/40* | (2006.01) |
| *F16B 21/02* | (2006.01) |
| *F16B 21/04* | (2006.01) |
| *F16B 21/06* | (2006.01) |
| *F16B 21/08* | (2006.01) |
| *F16L 3/127* | (2006.01) |
| *F16L 3/13* | (2006.01) |
| *H02G 3/00* | (2006.01) |
| *H02G 3/32* | (2006.01) |
| *F16B 2/22* | (2006.01) |
| *F16L 3/24* | (2006.01) |

(52) U.S. Cl.
CPC ............ *F16B 21/04* (2013.01); *F16B 21/065* (2013.01); *F16B 21/086* (2013.01); *F16L 3/127* (2013.01); *F16L 3/13* (2013.01); *F16M 13/022* (2013.01); *H02G 3/263* (2013.01); *H02G 3/32* (2013.01); *F16B 2/22* (2013.01); *F16L 3/24* (2013.01)

(58) Field of Classification Search
USPC ............... 248/50, 62, 74.2, 74.4, 225.51, 222.41, 248/231.81, 316.7
See application file for complete search history.

(56) References Cited

U.S. PATENT DOCUMENTS

| | | | | |
|---|---|---|---|---|
| 3,827,152 | A | * | 8/1974 | Dailey ................ B43K 23/001 211/69 |
| 5,507,460 | A | * | 4/1996 | Schneider ........... A61M 5/1418 24/601.2 |
| 2008/0296443 | A1 | | 12/2008 | Lunitz et al. |
| 2013/0047385 | A1 | | 2/2013 | Healy et al. |
| 2013/0104494 | A1 | | 5/2013 | Evangelista et al. |
| 2014/0050571 | A1 | * | 2/2014 | Sauerhoefer .......... F01D 25/243 415/182.1 |
| 2016/0047494 | A1 | * | 2/2016 | Dickinson ........... B60R 16/0215 248/74.2 |

FOREIGN PATENT DOCUMENTS

| | | |
|---|---|---|
| DE | 102007060030 | 12/2008 |
| EP | 2562432 | 2/2013 |

\* cited by examiner

BRACKET FOR TUBULAR ELEMENT, IN PARTICULAR FOR AIRCRAFT

CROSS-REFERENCES TO RELATED APPLICATIONS

This application claims the benefit of the French patent application No. 1551578 filed on Feb. 24, 2015, the entire disclosures of which are incorporated herein by way of reference.

BACKGROUND OF THE INVENTION

The present invention concerns a tubular element bracket, notably for an aircraft, and in particular for a transport aircraft.

In the context of the present invention, by tubular element is meant:
- a single wire or cable, notably an electrical wire or cable; or
- a bundle or harness comprising a plurality of wires or cables.

It may equally refer to networks or pipes.

The present invention applies more particularly, although not exclusively, to electrical cables.

Such tubular element brackets are intended for fixing a tubular element, preferably inside an aircraft, and generally to a primary structural element, that is to say an element of the structure of the aircraft, or to a secondary structural element, that is to say a support fixed to a primary structural element. These brackets are successively arranged in a line defining the path taken by the cable.

Such tubular element brackets generally comprise, as shown in FIG. 1:
- a fixing plate 200 that is intended to be fixed by various possible types of means to an appropriate support of the aircraft;
- an elongate central portion 201 that is orthogonal to this fixing plate and that extends away from the support when the fixing plate 200 is fixed to the latter; and
- an attachment element 202.

For its part, the attachment element 202 is fixed to the free end of the central portion 201, generally with the aid of a screw 204 that can be screwed into a threaded hole provided in the central portion 201. This attachment element is intended to receive the cable, which is attached to the latter afterwards.

Installing a cable with the aid of the usual elements of this kind necessitates the use of a tool, a certain amount of time and a certain number of manual operations. To be more precise, at each fixing point it is necessary to carry out all of the following operations:
- fixing the fixing plate 200 to a structural element of the aircraft, for example by riveting or screwing;
- fixing the central portion 201 to the fixing plate 200;
- placing the cable on the attachment element 202; and
- fixing the attachment element 202 to the central portion 201, generally using a screw and a washer.

This installation of a cable, which therefore necessitates a certain number of operations for each fixing point, generates a high workload, because the installation of a single cable generally necessitates a large number of such fixing points.

SUMMARY OF THE INVENTION

An object of the present invention is to remedy this drawback.

To this end, the present invention concerns a tubular element bracket, notably for aircraft, the bracket comprising:
- at least one central body elongate along a longitudinal axis, comprising a central portion elongate along the longitudinal axis and a support element intended to receive at least one tubular element, the support element being arranged at one end of the central body, referred to as the upper end;
- a fixing plate intended to be fixed to a support, notably of an aircraft.

In accordance with the invention, the central portion and the bracket are in one piece, the bracket being in the form of an open fixing collar, and the bracket comprises fixing means configured to enable the central body to be fixed manually and autonomously to the fixing plate at its other end, referred to as the lower end.

In accordance with the invention, a simplified tubular element bracket is therefore obtained, the central body of which is made in one piece and with which it is, in particular, not necessary to connect an attachment (or support) element to the central body. In actual fact, it suffices to fix the whole of the central body to the fixing plate and then to fix the whole of the bracket to a support by means of the fixing plate, and a tubular element, notably a cable, can be directly attached to the support element of the bracket, which is appropriately configured, that is to say, so as to be able to receive a tubular element without damaging it. Moreover, due to the presence of the fixing means configured to enable the central body to be fixed manually and autonomously to the fixing plate it is no longer necessary to use a tool, which also facilitates fixing.

Therefore, by means of such tubular element brackets it is possible to fix a tubular element rapidly and easily with a reduced number of operations, as explained hereinafter.

In accordance with one aspect of the invention, the fixing means are configured to fix the central body to the fixing plate removably.

In accordance with a first embodiment of the invention, the fixing means comprise a base arranged at the lower end of the central body, the base being configured to be fixed to the fixing plate, the central portion connecting the base to the support element.

The fixing means advantageously comprise at least two lugs arranged on the central portion, and each comprising at one end a rim connected to the base by means of a connection adapted to be broken, the central portion being configured so that it can be detached from the base by breaking the connection adapted to be broken so that the rim is positioned between the base and the fixing plate.

In accordance with one aspect of the invention, the fixing means comprise a rod arranged on the fixing plate and situated between the lugs of the central body, the rod being configured to act laterally relative to the longitudinal axis on the central portion in order to move the lugs apart when longitudinal pressure is exerted on the central body parallel to the longitudinal axis and in a direction moving the central body closer to the fixing plate.

In accordance with one embodiment of the invention, the rod comprises a rod head at the level of its distal end, the rod head being adapted to be broken by longitudinal pressure exerted on the central body.

In accordance with one aspect of the invention common to second and third embodiments of the invention, the fixing means comprise radial protuberances, extending radially relative to the longitudinal axis at the lower end of the central body, the fixing means further comprising a fixing end piece arranged on the fixing plate and including an opening allowing the entry by movement in translation along the longitudinal axis of a portion of the central body comprising the radial protuberances in accordance with a first angular orientation of the central body around the longitudinal axis relative to the fixing plate, the fixing end piece comprising a cavity for locking the radial protuberances to the fixing plate, the locking cavity being adapted to receive the radial protuberances following rotation of the central body around the longitudinal axis from the first angular orientation to a second angular orientation of the central body, the fixing means comprising immobilizing means configured to immobilize the radial protuberances in the locking cavity so as to fix the central body to the fixing plate.

In accordance with the second embodiment of the invention, the fixing end piece comprises an interior spline configured to guide the radial protuberances from the opening of the end piece to the locking cavity by rotation of the central body around the longitudinal axis between the first and second angular orientations of the central body.

In accordance with one embodiment of the invention, the immobilizing means comprise elastic means arranged on the fixing end piece and configured to push the central body back along the longitudinal axis in a direction moving it away from the fixing plate so as to retain the radial protuberances in the locking cavity.

The elastic means advantageously comprise a border positioned around the opening of the end piece and configured to press against a platform of the central body along the longitudinal axis in a direction moving the central body away from the fixing plate.

In accordance with the third embodiment of the invention, the immobilizing means comprise an intermediate portion hooked onto the central body, the intermediate portion being configured so that it can be moved from a free position allowing the movement of the central body relative to the fixing plate to a retaining position retaining the radial protuberances in the locking cavity.

In accordance with one aspect of the invention, the intermediate portion serves as a lever between its free position and its retaining position to move the central body relative to the fixing plate.

In accordance with a first aspect of the third embodiment of the invention, the intermediate portion comprises first fixing means configured to retain the intermediate portion on the central body in its retaining position.

In accordance with a second aspect of the third embodiment of the invention, the intermediate portion comprises second fixing means configured to retain the intermediate portion on the fixing plate in its retaining position.

In accordance with one embodiment, the bracket comprises a plurality of central bodies and a single fixing plate.

Moreover, the present invention also concerns an aircraft, in particular a transport aircraft, that comprises at least one bracket as cited above.

BRIEF DESCRIPTION OF THE DRAWINGS

The appended figures explain clearly how the invention may be reduced to practice. In these figures, identical references designate similar elements.

DETAILED DESCRIPTION OF THE PREFERRED EMBODIMENTS

Figure 1:
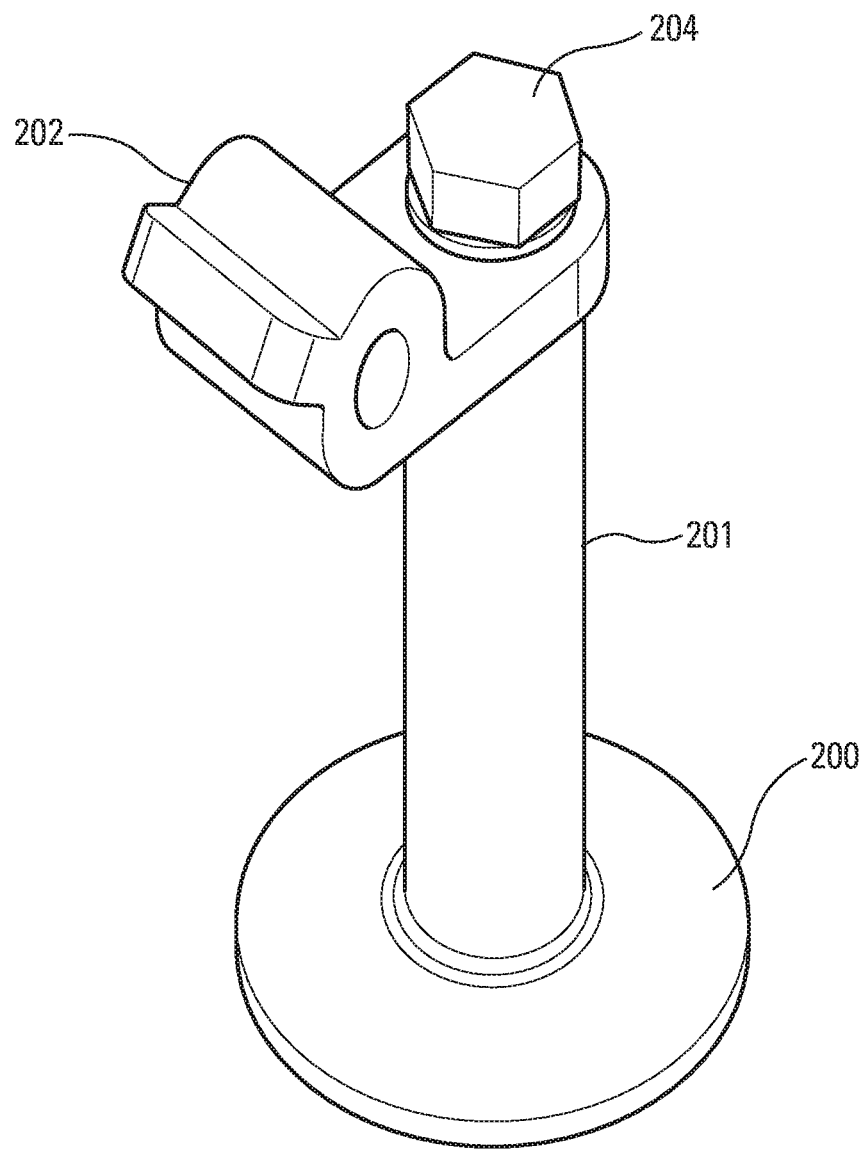
FIG. 1 is a perspective view of a prior art bracket.

The bracket 1 in accordance with a number of embodiments of the invention shown in FIGS. 2, 7, 13 and 19 is more particularly, although not exclusively, intended to be mounted on an aircraft (not shown), in particular a transport aircraft, with the aim of fastening a tubular element, preferably a cable, in particular an electrical cable, generally to an appropriate structural element, notably the fuselage of the aircraft or a structural element that is fixed to the fuselage of the aircraft.

This bracket 1 comprises at least one central body 2 of elongate shape along a longitudinal axis L. The central body 2 comprises a central portion 3 elongate along the longitudinal axis L and a support element 4 intended to receive at least one cable. The support element 4 is arranged at a first end 2B of the central body 2 along the longitudinal axis L, referred to as the upper end 2B.

The bracket 1 also comprises a fixing plate 5 that is intended to be fixed to the structural element of the aircraft (not shown).

Figure 2:
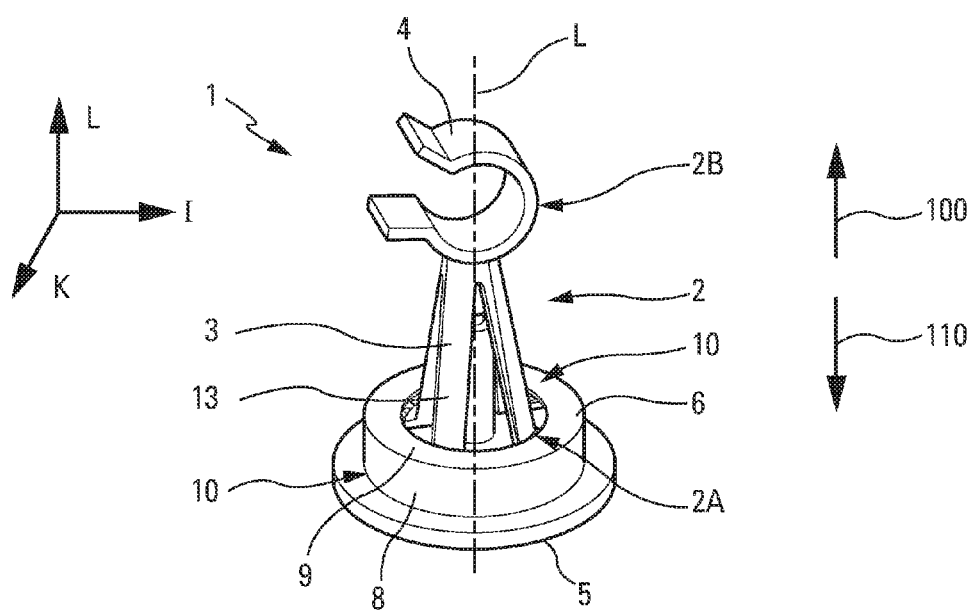
FIG. 2 is a perspective view of a bracket in accordance with a first embodiment of the invention.

In the remainder of the description and as shown in FIG. 2, there is meant by:
outward direction 100, the direction along the longitudinal axis L moving the central body 2 away from the support (not shown) to which the fixing plate 5 is fixed or is intended to be fixed; and
inward direction 110, the direction along the longitudinal axis L moving the central body 2 toward the support on which the fixing plate 5 is fixed or is intended to be fixed.

The outward direction 100 moves the central body 2 away from the fixing plate 5 and the inward direction 110 moves the central body 2 toward the fixing plate 5. Moreover, two axes I and K form with the axis L an orthogonal system of axes.

In accordance with the invention, the central portion 3 and the support element 4 of the central body 2 are in one piece. By "in one piece" is meant that the central portion 3 and the support element 4 form a unit. The support element 4 takes the form of an open fixing collar.

Moreover, the bracket 1 comprises fixing means 10 configured for fixing the central body 2 manually and autonomously to the fixing plate 5 at a second end 2A of the central body 2 along the longitudinal axis L, referred to as the lower end 2A. The fixing means 10 can be part of the central body 2, of the fixing plate 5 or of both the central body 2 and the fixing plate 5.

Moreover, the fixing means 10 make it possible to fix the central body 2 to the fixing plate 5 removably. It is therefore possible to fasten together and unfasten the central body 2 and the fixing plate 5 without using tools.

A first embodiment of the invention is shown in FIGS. 2 to 6. In accordance with this first embodiment, the fixing means 10 comprise a base 6 arranged at the lower end 2A of the central body 2. The base 6 is moreover configured to be fixed to the fixing plate 5. The central portion 3 connects the base 6 to the support element 4. The base 6 is of annular shape. It comprises a lateral wall 8 extending parallel to the longitudinal axis L and having an internal face 8a delimiting an opening 7 and an external face 8b directed outwards.

The base 6 has ribs 11 on the internal face 8A. The base 6 comprises an upper wall 9 perpendicular to the longitudinal axis L.

The fixing plate 5 comprises a raised pattern 19 including grooves 12 configured to cooperate with the ribs 11. It also comprises a rod 16. The rod 16 extends longitudinally along the longitudinal axis L from the raised pattern 19 to a distal end of the rod 16. The rod 16 comprises a principal portion 17A connected to the raised pattern and a rod head 17B, for example spherical, at the level of the distal end.

Figure 6:
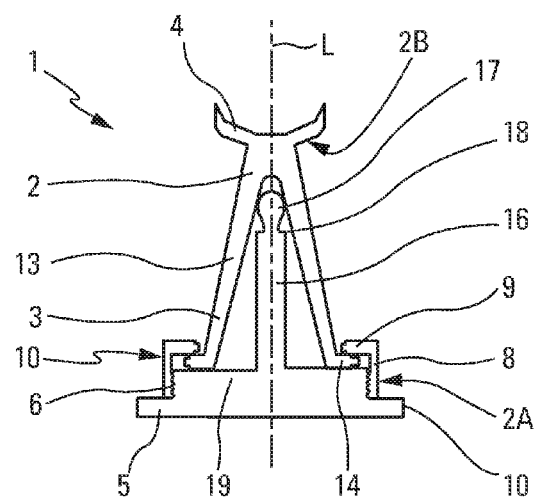
FIG. 6 shows diagrammatically in section the bracket from FIG. 2.
Figure 7:
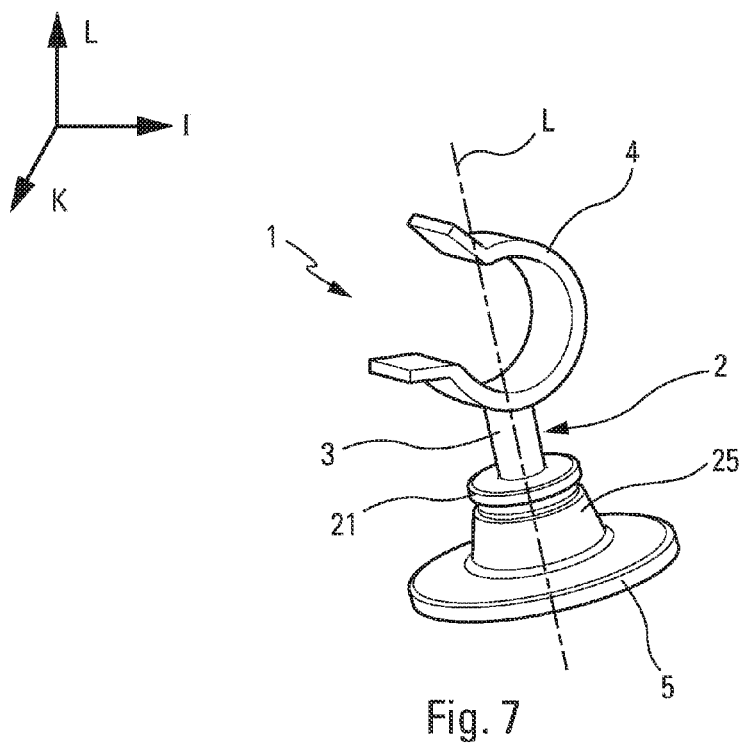
FIG. 7 is a perspective view of a bracket in accordance with a second embodiment of the invention.
Figures 8, 9:
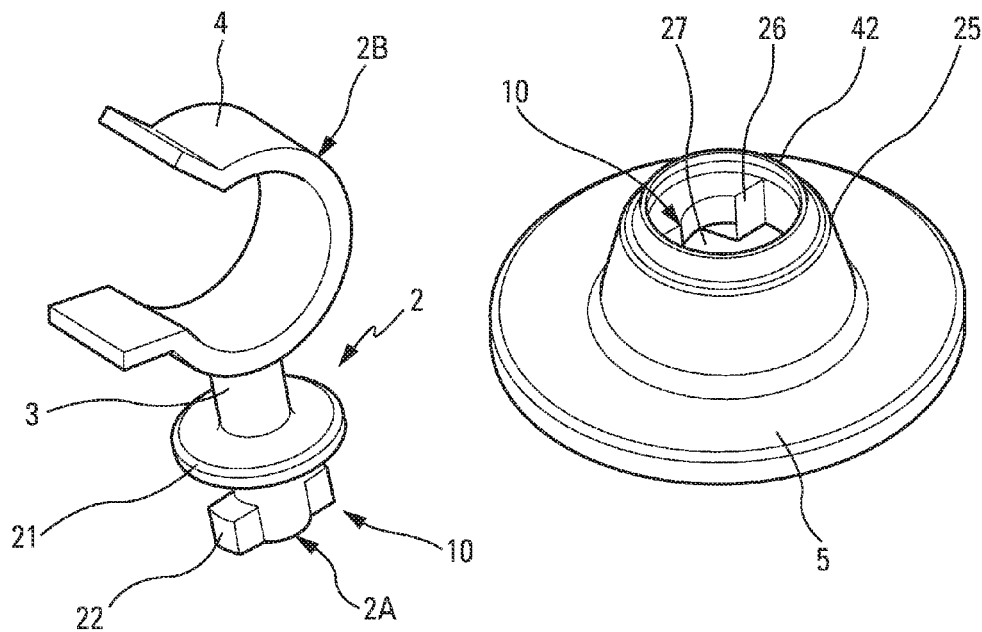
FIG. 8 is a perspective view of a central body of the bracket from FIG. 7.
FIG. 9 is a perspective view of a fixing plate of the bracket from FIG. 7.

As shown in FIG. 6, the rod head 17 is connected to the central portion of the rod 16 by a connection 18 adapted to be broken by longitudinal pressure exerted on the central body 2. In actual fact, the connection 18 has a section perpendicular to the longitudinal axis L smaller than those of the rod head 17B and the principal portion 17A so as to facilitate it breaking when stressed by longitudinal pressure exerted on the central body 2.

Figures 3, 4:
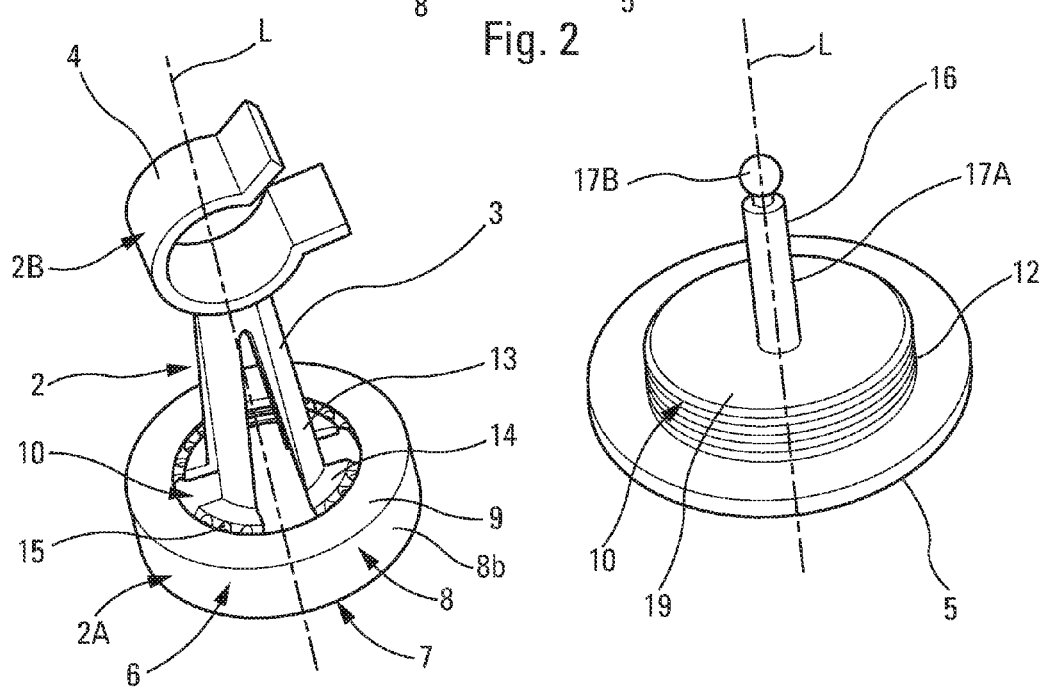
FIG. 3 is a perspective view of a central body of the bracket from FIG. 2.
FIG. 4 is a perspective view of a fixing plate of the bracket from FIG. 2.

The fixing means 10 also comprise at least two lugs 13, here four lugs 13 in the example of FIGS. 2 and 3. The lugs 13 are arranged on the central portion 3. Each lug 13 has at a first end a rim 14 connected to the base 6 by a connection 15 adapted to be broken. The connection 15 adapted to be broken is formed by a bridge of material connecting the base 6 to the rims 14. The central portion 3 is therefore configured so that it can be detached from the base 6 by breaking the connection 15 adapted to be broken.

A second end of each lug 13 is connected to the support element 4. The set of lugs 13 therefore forms a truncated cone.

Moreover, the fixing means 10 also comprise the rod 16. The rod 16 is situated between the lugs 13 of the central body 2 in the position with the central body 2 mounted on the fixing plate 5.

Figures 5A, 5B, 5C, 5D:
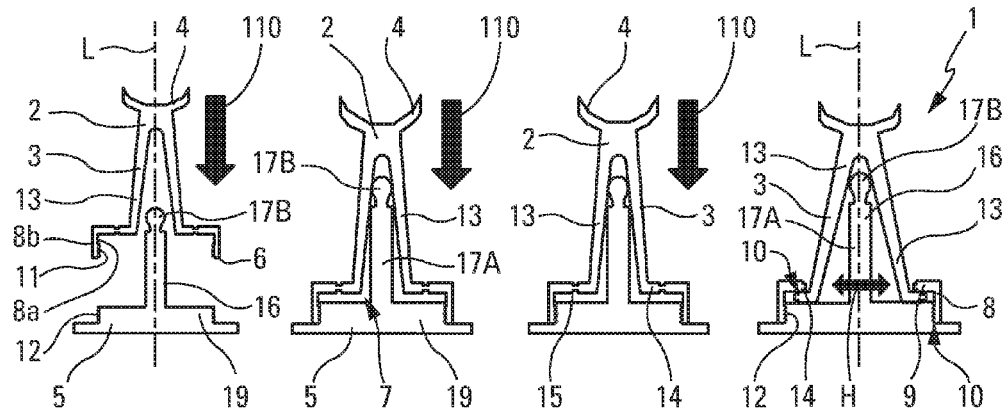
FIGS. 5A to 5D show diagrammatically successive steps of a method of fixing the central body to the fixing plate to form the bracket in accordance with the first embodiment of the invention.

FIGS. 5A to 5D show the successive steps of fixing the central body 2 to the fixing plate 5 to produce the bracket 1 assembled in accordance with the first embodiment of the invention. These steps comprise:

firstly, positioning the central body 2 above the fixing plate 5 so that the lugs 13 are above the rod 16 (FIG. 5A);

then moving the central body 2 closer in the inward direction 110 until the base 6 becomes fixed to the fixing plate 5, notably by cooperation between the ribs 11 of the lateral wall 8 of the base 6 and the grooves 12 of the raised pattern 19 of the fixing plate 5 (FIG. 5B). The annular base 6 therefore surrounds the raised pattern 19 of the fixing plate 5. The upper wall 9 of the base 6 nevertheless remains at a distance from the raised pattern 19 so that a space remains between the upper wall 9 and the fixing plate 5;

then exerting pressure on the central body 2 in the inward direction 110 until the connection 15 adapted to be broken breaks (FIG. 5C) so that the rim 14 is positioned between the base 6 and the fixing plate 5 (54D). The rod head 17 exerts a force on the central portion 3 in order to move the lugs 13 apart in a direction H that is lateral with respect to the longitudinal axis L and lies in a plane defined by the axes I and K. When longitudinal pressure is exerted on the central body 2 in the inward direction 110, the rod head 17 therefore moves the lugs 13 apart once they have been released from the base 6 in order to position them between the base 6 and the fixing plate 5. The central portion 3 is therefore fixed to the fixing plate 5.

Moreover, once detached, the rod head 17 continues to exert lateral pressure on the lugs 13 so as to retain the rims 14 between the base 6 and the fixing plate 5. Each rim 14 is therefore immobilized between the upper wall 9 of the base 6 and the raised pattern 19 of the fixing plate 5.

In the first embodiment of the invention described above with reference to FIGS. 2 to 6, the fixing means 10 configured to enable the central body 2 to be fixed manually and autonomously to the fixing plate 5 by its lower end 2A therefore notably comprise the lugs 13, the rims 14, the connection 15 adapted to be broken, the base 6, the raised pattern 19 and/or the rod 16.

A second embodiment of the invention is shown in FIGS. 7 to 12. In this second embodiment, the central body 2 of the bracket 1 comprises, at the level of its central portion 3, a platform 21 that is circular and that extends radially relative to the longitudinal axis L. The platform 21 is arranged in the middle of the central portion 3 along the longitudinal axis L.

The fixing means 10 comprise protuberances 22 extending radially relative to the longitudinal axis L, referred to as radial protuberances 22. The central body 2 has these radial protuberances 22 at its lower end 2A. The central body 2 notably comprises two radial protuberances 22 opposite each other with respect to the longitudinal axis L.

Moreover, the fixing means 10 comprise a fixing end piece 25 including an opening 26 allowing the entry by movement in translation along the longitudinal axis L of the lower end 2A of the central body 2 comprising the radial protuberances 22. The fixing end piece 25 is part of the fixing plate 5.

The opening 26 and the lower end 2A of the central body 2 including the radial protuberances 22 have complementary shapes so that introduction of the lower end 2A into the fixing end piece 25 is allowed for a first angular orientation of the central body 2 around the longitudinal axis L. The angular orientation of the central body 2 is defined relative to the fixing plate 5.

Moreover, the fixing end piece 25 includes a locking cavity 27 for locking the radial protuberances 22 to the fixing plate 5. The locking cavity 27 has a shape complementary to that of the radial protuberances 22. The locking cavity 27 extends in accordance with a second angular orientation relative to the longitudinal axis L distinct from the first angular orientation. The locking cavity 27 is adapted to receive the radial protuberances 22 following rotation of the central body 2 around the longitudinal axis L from the first angular orientation to the second angular orientation of the central body 2.

Moreover, the fixing means 10 include immobilizing means 40 configured to immobilize the radial protuberances 22 in the locking cavity 27 so as to fix the central body 2 to the fixing plate 5.

In the second embodiment, the immobilizing means 40 comprises elastic means 41. The elastic means 41 are arranged on the fixing end piece 25. They are configured to push the central body 2 back along the longitudinal axis L in the outward direction 100 so as to retain the radial protuberances 22 in the locking cavity 27.

The elastic means 41 comprise a border 42 positioned around the opening 26 of the fixing end piece 25 and configured to press against the platform 21 of the central body 2 along the longitudinal axis L in the outward direction 100.

Figure 11:
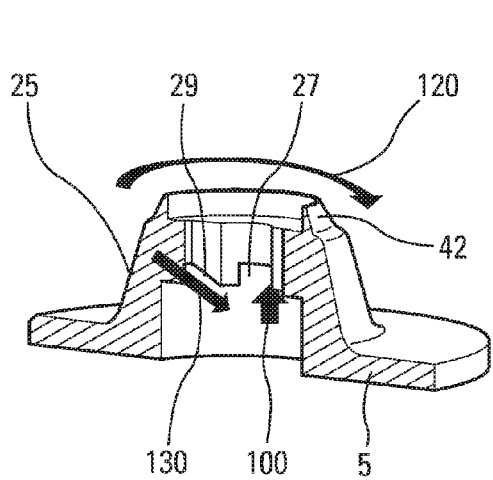

As can be seen in FIG. 11, the fixing end piece 25 also comprises an interior spline 29 configured to guide the radial protuberances 22 as shown by the arrow referenced 130 from the opening 26 of the fixing end piece 25 to the locking cavity 27 on rotation of the central body 2 around the longitudinal axis L between the first and second angular positions of the central body 2.

Figure 10:
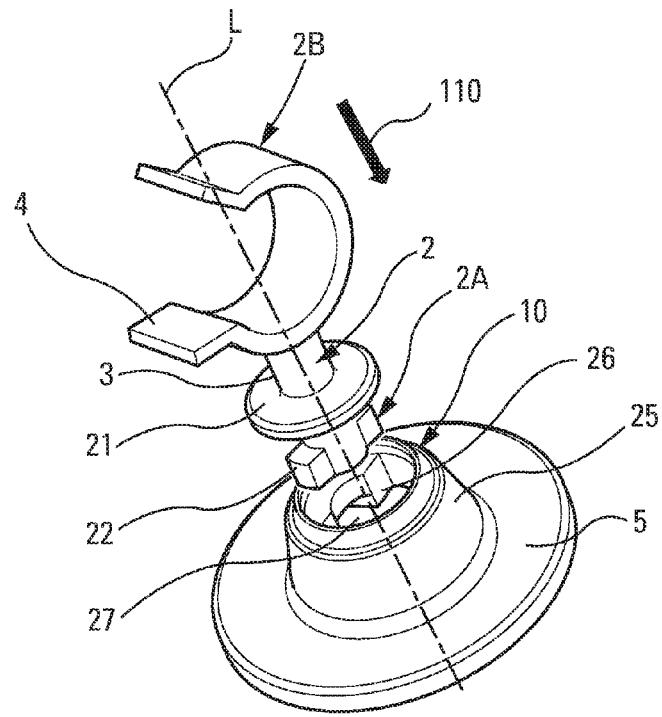
FIGS. 10 to 12 show successive steps of a method of fixing the central body to the fixing plate to form the bracket in accordance with the second embodiment of the invention.
Figure 12:
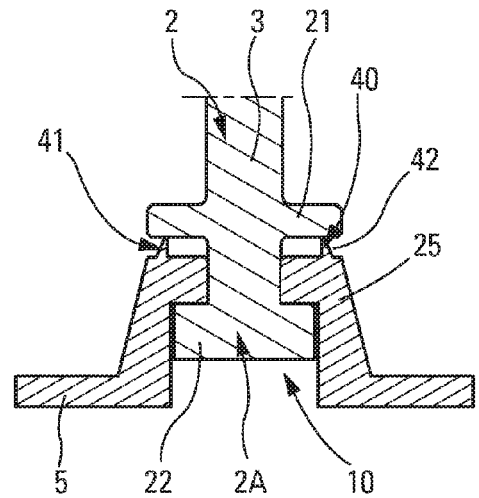

FIGS. 10 to 12 show various steps of fixing the central body 2 to the fixing plate 5 to obtain the bracket 1 assembled in accordance with the second embodiment of the invention described above with reference to FIGS. 7 to 9.

These steps comprise:
firstly, positioning the central body 2 above the fixing plate 5 so that the radial protuberances 22 are above the opening 26 and the central body 2 is oriented in accordance with the first orientation (FIG. 10);
then moving the central body 2 closer in the inward direction 110 so that its lower end 2A penetrates to the interior of the fixing end piece 25;
then rotating the central body 2 as shown by the arrow referenced 120 in FIG. 11 to cause the central body 2 to move from its first angular orientation to its second angular orientation. During this rotation, the radial protuberances 22 are guided by the guide ramp 29 from the opening 26 to the locking cavity 27. As well as rotating about the longitudinal axis L, the central body 2 continues its movement in translation in the inward direction 110.

The platform 21 therefore compresses the border 42 during the movement of the central body 2 from its first to its second angular orientation so that, when the radial protuberances 22 come to face the locking cavity 27, the central body 2 is pushed back by the border 42 in the outward direction 100 and the radial protuberances 22 are retained in the locking cavity 27. The central body 2 is therefore fixed to the fixing plate 5 (FIG. 12).

In this second embodiment of the invention, the fixing means 10 configured to make it possible to fix the central body 2 manually and autonomously to the fixing plate 5 by its lower end 2A notably comprise the radial protuberances 22, the platform 21, the fixing end piece 25, the opening 26, the locking cavity 27 and/or the border 42.

Figure 13:
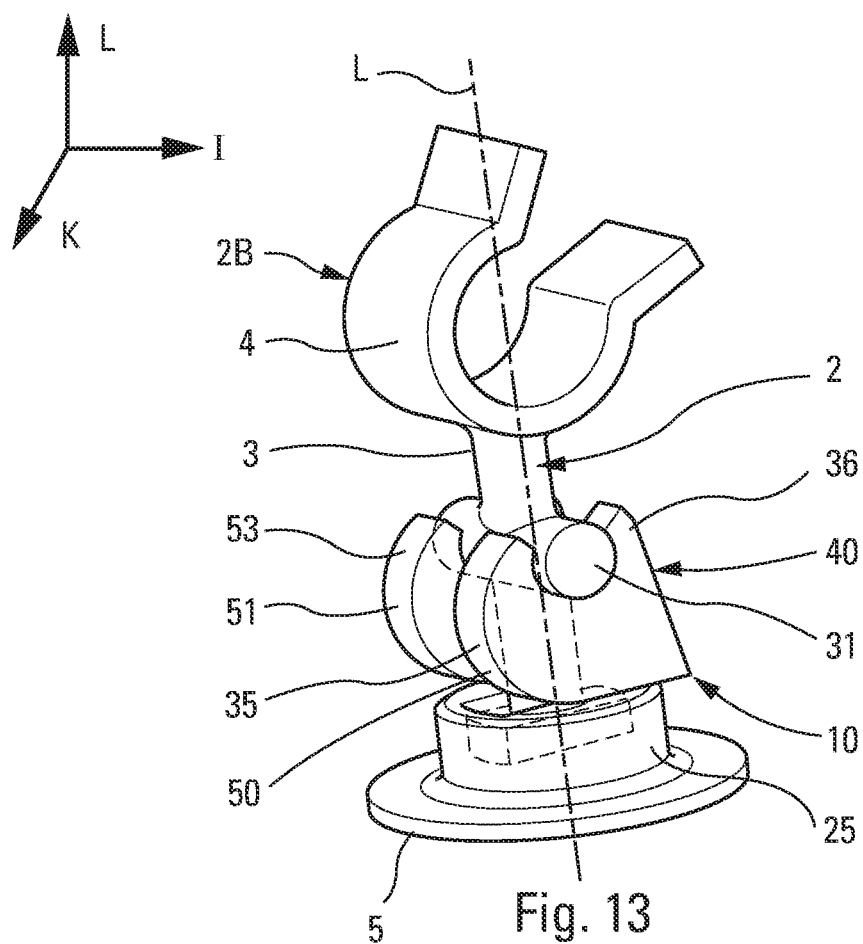
FIG. 13 is a perspective view of a bracket in accordance with a first variant of a third embodiment of the invention.
Figure 14:
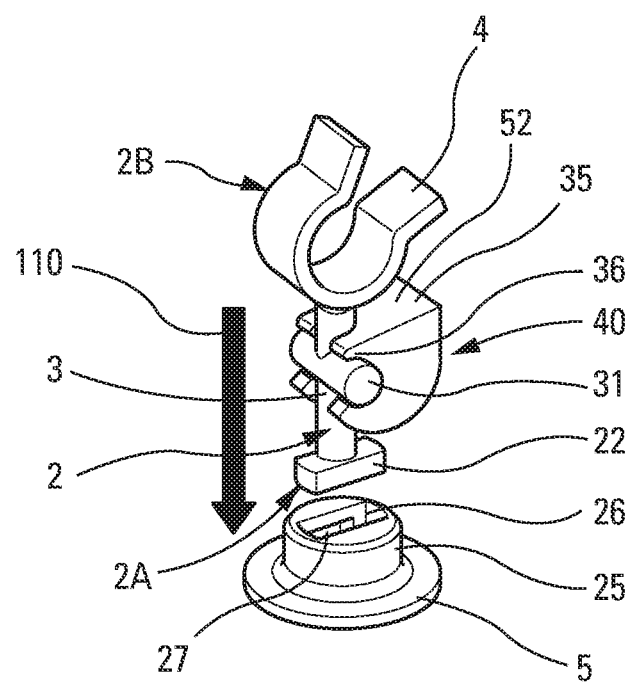
FIGS. 14 to 17 show diagrammatically successive steps of a method of fixing the central body to the fixing plate to form the bracket in accordance with the first variant of the third embodiment of the invention.

A first variant of a third embodiment of the invention is shown in FIGS. 13 to 17. As shown in FIG. 13, the central body 2 comprises at the level of its central portion 3 a radial shaft 31 extending radially relative to the longitudinal axis L on either side of the central portion 3. The radial shaft 31 is arranged in the middle of the central portion 3 along the longitudinal axis L.

The fixing means 10 comprise radial protuberances 22 extending radially relative to the longitudinal axis L. The central body 2 has these radial protuberances 22 at its lower end 2A. The central body 2 notably comprises two radial protuberances 22 opposite each other relative to the longitudinal axis L.

Moreover, the fixing means 10 comprise a fixing end piece 25 including an opening 26 allowing the entry by movement in translation along the longitudinal axis L of a portion of the central body 2 comprising the radial protuberances 22. The fixing end piece 25 is part of the fixing plate 5.

The opening 26 and the lower end 2A of the central body 2 including the radial protuberances 22 have complementary shapes so that the introduction of the lower end 2A into the fixing end piece 25 is allowed for a first angular orientation of the central body 2 around the longitudinal axis L relative to the fixing plate 5.

Moreover, the fixing end piece 25 comprises a locking cavity 27 for locking the radial protuberances 22 to the fixing plate 5. The locking cavity 27 has a shape complementary to that of the radial protuberances 22. The locking cavity 27 extends in accordance with a second angular orientation relative to the longitudinal axis L different from the first angular orientation. The locking cavity 27 is adapted to receive the radial protuberances 22 following rotation of the central body 2 around the longitudinal axis L from the first angular orientation to the second angular orientation of the central body relative to the fixing plate 5.

Moreover, the fixing means 10 comprise immobilizing means 40 configured to immobilize the radial protuberances 22 in the locking cavity 27 so as to fix the central body 2 to the fixing plate 5.

In the third embodiment of the invention, the immobilizing means 40 comprise an intermediate portion 35 hooked onto the central body 2 and notably onto the radial shaft 31. To this end, the intermediate portion 35 comprises means 36 for hooking it onto the central body 2. The hooking on means 36 take the form of pincers that clip onto the radial shaft 31. The intermediate portion 35 comprises two lateral walls 50, 51 situated on either side of the central portion 3 and terminated by pincers hooked onto the radial shaft 31. The lateral walls 50, 51 are connected together by a back 52. The space between the lateral walls 50, 51 is left free so that the intermediate portion 35 can pivot around the radial shaft 31, thanks to the pincers, until the central portion 3 of the central body 2 comes into contact with the back 52. The intermediate portion 35 comprises fixing means 37 configured to retain the intermediate portion 35 on the central body 2. The fixing means 37 are situated on the back 52. They comprise a pincer making it possible to clip the intermediate portion 35 onto the central portion 3.

The intermediate portion 35 is configured so that it can be moved from a free position allowing the movement of the central body 2 relative to the fixing plate 5 (FIG. 15) to a position retaining the central body 2 on the fixing plate 5.

In the retaining position, the intermediate portion 35 retains the radial protuberances 22 in the locking cavity 27

Figures 15, 16:
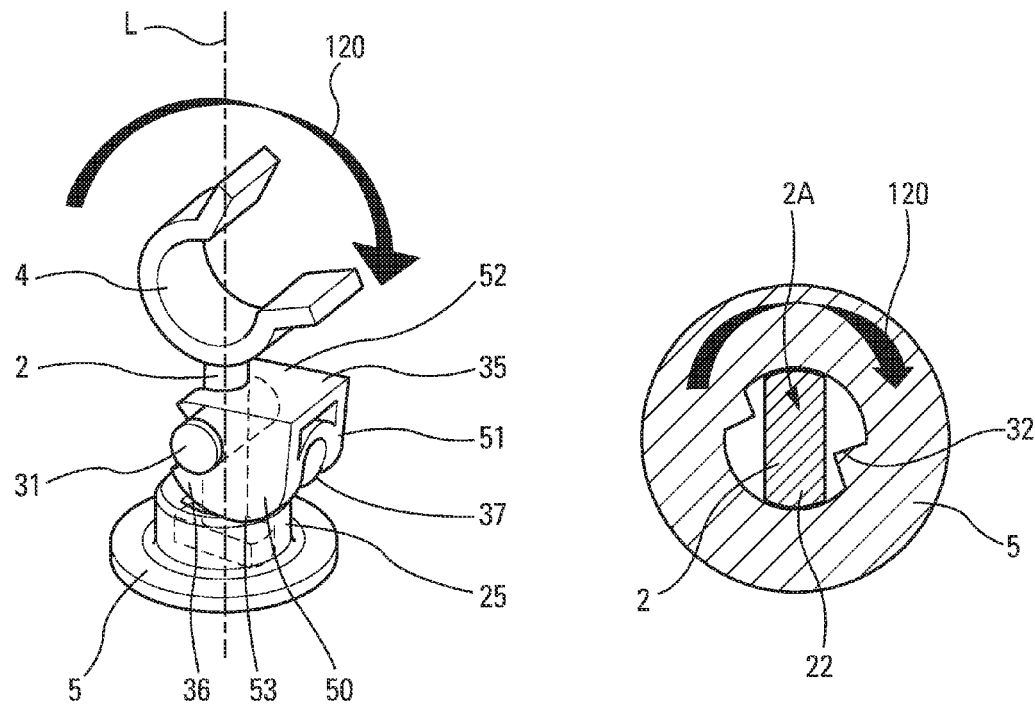
Figure 17:
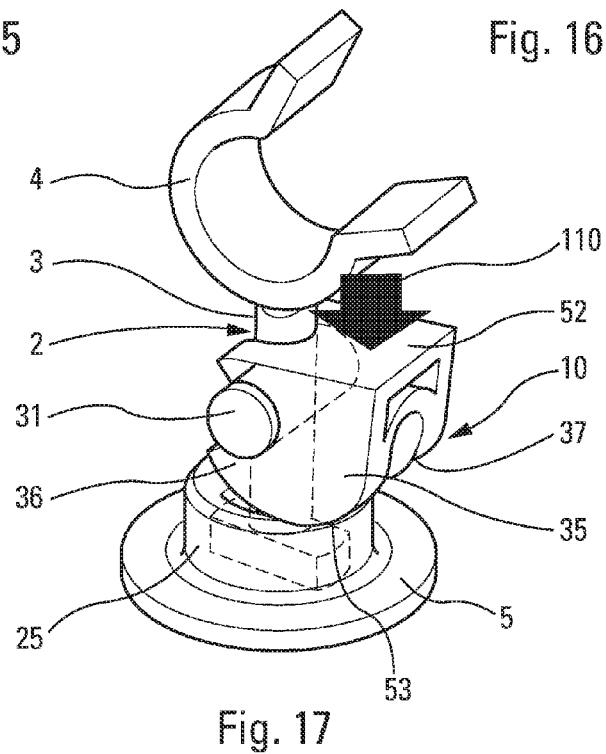

(FIG. 13). The dimension along the longitudinal axis L of the part of the intermediate portion 35 situated between the fixing plate 5 and the radial shaft 31 in the position retaining the intermediate portion 35 (FIG. 13) is greater than the dimension along the longitudinal axis L of the part of the intermediate portion 35 situated between the fixing plate 5 and the radial shaft 31 in the free position of the intermediate portion 35 (FIG. 15). As specified hereinafter, this size difference makes it possible for the intermediate portion 35 to serve as a lever between its free position and its retaining position when it is positioned against the fixing plate to move the central body 2 relative to the fixing plate 5.

FIGS. 14 to 17 show successive steps of fixing the central body 2 to the fixing plate 5 to produce the bracket 1 assembled in accordance with the first variant of the third embodiment of the invention as described above.

These steps comprise:
firstly, positioning the central body 2 over the fixing plate 5 so that the radial protuberances 22 are over the opening 26 and the central body 2 is oriented in accordance with the first orientation relative to the fixing plate 5 (FIG. 14);
then moving the central body 2 closer in the inward direction 110 so that its lower end 2A penetrates to the interior of the fixing end piece 25;
effecting this movement in translation until the intermediate portion 35 comes into contact with the fixing plate 5, and notably the fixing end piece 25 of the fixing plate 5. The intermediate portion 35 is then in its free position;
then rotating the central body 2 as shown by the arrow referenced 120 in FIG. 15 to cause the central body 2 to move from its first angular orientation to its second angular orientation relative to the fixing plate 5;
continuing the rotation until the radial protuberances 22 reach abutments 32 of the fixing end piece 25 (FIG. 16) preventing the rotation of the central body 2 at the level of its second angular orientation so that the radial protuberances 22 are located facing the locking cavity 27 (FIG. 17);
then exerting pressure on the intermediate portion 35 at the level of its back 52 in the inward direction 110 so as to cause the intermediate portion 35 to move from its free position to its retaining position. The intermediate portion 35 is configured so that when it is located in its free position in contact with the fixing plate (FIG. 15) the distance between the fixing plate and the radial shaft 31 is less than the same distance when the intermediate portion 35 is located in its retaining position (FIG. 13).

On moving from its free position to its retaining position, the intermediate portion 35 acts as a lever to raise the central body 2 relative to the fixing plate 5 in the outward direction 100. To this end the lateral walls 50 and 51 of the intermediate portion 35 comprise a rounded edge 53 in contact with the fixing plate 5, encouraging rotation of the intermediate portion 35 relative to the central body 2. To move from its free position to its retaining position the intermediate portion 35 effects a rotation of approximately 90°.

Once it has reached its retaining position (FIG. 13), the intermediate portion 35 is fixed to the central body 2 by means of the fixing means 37 and retains the radial protuberances 22 in the locking cavity 27 so that the central body 2 is fixed to the fixing plate 5. The intermediate portion 35 is then in contact with the fixing plate 5 in its retaining position.

Figure 18:
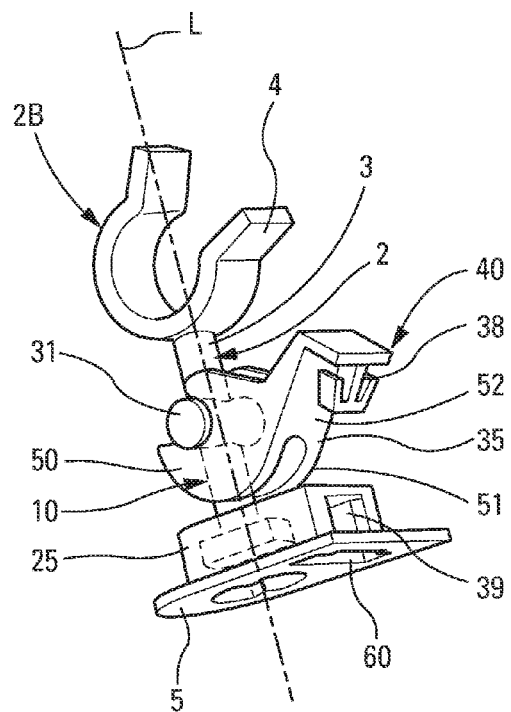
FIGS. 18 to 20 show diagrammatically steps of a method of fixing the central body to the fixing plate to form the bracket in accordance with a second variant of the third embodiment of the invention.
Figure 19:
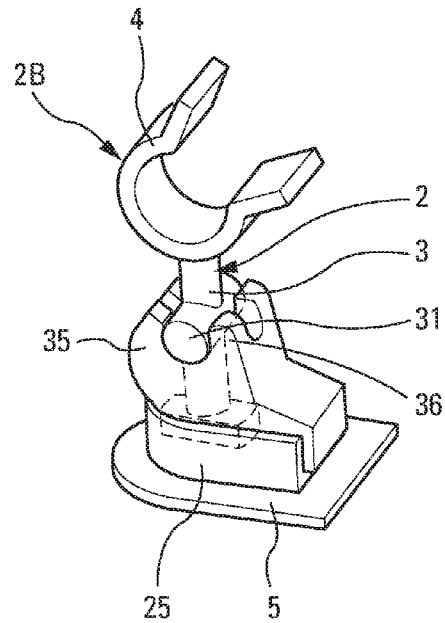
Figure 20:
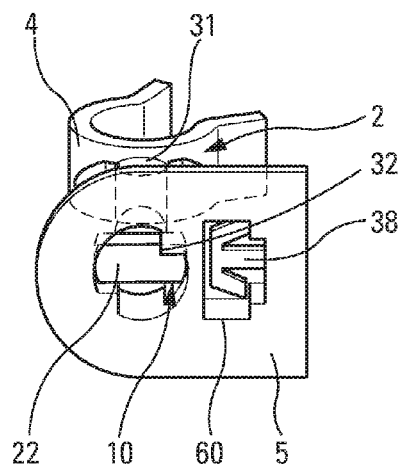

Moreover, a second variant of the third embodiment of the invention is shown in FIGS. 18 to 20. In this second variant of the third embodiment of the invention, the only difference compared to the first variant is the presence of a recess 39 on the fixing plate 5 and the fact that the fixing means 37 for fixing the intermediate portion 35 to the central body 2 are replaced by fixing means 38 for fixing the intermediate portion 35 to the fixing plate 5. Their functions are identical, however, namely to retain the intermediate portion 35 in its retaining position and therefore to retain the central body 2 fixed to the fixing plate 5.

The fixing means 38 have the shape of an anchor and are adapted to penetrate to the interior of the recess 39 and to be clipped therein as can be seen in FIG. 20.

The fixing plate 5 moreover comprises an orifice 60 situated under the fixing plate 5 and making it possible to unfasten the (anchor shaped) fixing means 38 from the recess 39.

In the third embodiment of the invention as described above, the fixing means 10 configured to make it possible to fix the central portion 2 manually and autonomously to the fixing plate 5 by its lower end 2A therefore notably comprise the radial protuberances 22, the radial shaft 31, the fixing end piece 25, the opening 26, the locking cavity 27, the intermediate portion 35, the hooking on means 36, the fixing means 37 for fixing the intermediate portion 35 to the central body 2 (first variant) and/or the fixing means 38 for fixing the intermediate portion 35 to the fixing plate 5 (second variant).

Figure 21:
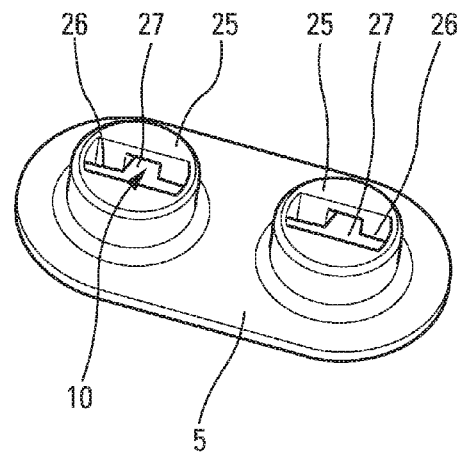
FIG. 21 is a perspective view of a variant fixing plate of the invention.

A variant embodiment of the fixing plate of the bracket 1 of the invention is shown in FIG. 21. The fixing plate 5 can in this case be fixed to a plurality of central bodies 2 forming a bracket 1 with this plurality of central bodies 2. Each of the central bodies 2 can then be fixed independently to the same fixing plate 5 in accordance with one of the three embodiments of the invention described above. In the example shown in FIG. 21, each of the two central bodies 2 would be fixed to the fixing plate 5 in accordance with the first variant of the third embodiment of the invention, as described above.

The various embodiments of the invention described above therefore make it possible to assemble and to fix the central body 2 or the central bodies 2 to the fixing plate 5 in a simple manner thanks to the autonomous fixing means and without tools.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A tubular element bracket, said bracket comprising:
at least one central body elongated along a longitudinal axis, comprising a central portion elongated along the longitudinal axis and a support element configured to receive at least one tubular element, said support ele- ment being arranged at one end of said central body, referred to as an upper end, the central portion and the support element being in one piece, said support element being in the form of an open fixing collar;

a fixing plate configured to be fixed to a support; and fixing means configured to make it possible to fix said central body manually and autonomously to said fixing plate by its other end, referred to as a lower end, the fixing means comprising radial protuberances, extending radially relative to the longitudinal axis at the lower end of the central body, said fixing means further comprising a fixing end piece arranged on said fixing plate and including an opening allowing an entry by movement in translation along the longitudinal axis of a portion of the central body comprising the radial protuberances in accordance with a first angular orientation of the central body around the longitudinal axis relative to the fixing plate, said fixing end piece comprising a cavity for locking the radial protuberances to the fixing plate, said locking cavity being adapted to receive the radial protuberances following rotation of the central body around the longitudinal axis from the first angular orientation to a second angular orientation of the central body, said fixing means comprising immobilizing means configured to immobilize the radial protuberances in the locking cavity so as to fix the central body to the fixing plate.

2. The bracket as claimed in claim 1, wherein the fixing means is configured to removably fix said central body to said fixing plate.

3. The bracket as claimed in claim 1, wherein the fixing end piece comprises an interior spline configured to guide the radial protuberances from the opening of the end piece to the locking cavity by rotation of the central body around the longitudinal axis between the first and second angular orientations of the central body.

4. The bracket as claimed in claim 1, wherein said immobilizing means comprise elastic means arranged on the fixing end piece and configured to push the central body back along the longitudinal axis in a direction moving it away from the fixing plate so as to retain the radial protuberances in the locking cavity.

5. The bracket as claimed in claim 4, wherein the elastic means comprise a border positioned around the opening of the end piece and configured to press against a platform of the central body along the longitudinal axis in a direction moving the central body away from the fixing plate.

6. The bracket as claimed in claim 4, wherein said immobilizing means comprise an intermediate portion hooked onto the central body, said intermediate portion being configured so that the intermediate portion can be moved from a free position allowing the movement of the central body relative to the fixing plate to a retaining position retaining the radial protuberances in the locking cavity.

7. The bracket as claimed in claim 6, wherein the intermediate portion comprises first fixing means configured to retain said intermediate portion on the central body in its retaining position.

8. The bracket as claimed in claim 6, wherein the intermediate portion comprises second fixing means configured to retain said intermediate portion on the fixing plate in its retaining position.

9. The bracket as claimed in claim 1, wherein the bracket comprises a plurality of central bodies and a single fixing plate.

10. An aircraft comprising a tubular element bracket, said bracket comprising:

at least one central body elongated along a longitudinal axis, comprising a central portion elongated along the longitudinal axis and a support element configured to receive at least one tubular element, said support element being arranged at one end of said central body, referred to as an upper end, the central portion and the support element being in one piece, said support element being in the form of an open fixing collar;

a fixing plate configured to be fixed to a support; and fixing means configured to make it possible to fix said central body manually and autonomously to said fixing plate by its other end, referred to as a lower end, the fixing means comprising radial protuberances, extending radially relative to the longitudinal axis at the lower end of the central body, said fixing means further comprising a fixing end piece arranged on said fixing plate and including an opening allowing the entry by movement in translation along the longitudinal axis of a portion of the central body comprising the radial protuberances in accordance with a first angular orientation of the central body around the longitudinal axis relative to the fixing plate, said fixing end piece comprising a cavity for locking the radial protuberances to the fixing plate, said locking cavity being adapted to receive the radial protuberances following rotation of the central body around the longitudinal axis from the first angular orientation to a second angular orientation of the central body, said fixing means comprising immobilizing means configured to immobilize the radial protuberances in the locking cavity so as to fix the central body to the fixing plate.

* * * * *